United States Patent [19]

Brudy

[11] E Re. 29,566

[45] Reissued Mar. 7, 1978

[54] FOLDABLE EMERGENCY REFLECTING DEVICE

[75] Inventor: Peter E. Brudy, West Hill, Canada

[73] Assignee: Dominion Auto Accessories Limited, Toronto, Canada

[21] Appl. No.: 707,223

[22] Filed: Jul. 21, 1976

Related U.S. Patent Documents

Reissue of:

[64] Patent No.: 3,806,234
Issued: Apr. 23, 1974
Appl. No.: 297,630
Filed: Oct. 16, 1972

[51] Int. Cl.[2] ..... G02B 5/12

[52] U.S. Cl. ..... 350/97; 116/63 P; 404/6

[58] Field of Search ..... 350/97, 99, 100; 404/6; 116/63 P

[56] References Cited

U.S. PATENT DOCUMENTS

| | | | |
|---|---|---|---|
| 1,895,173 | 1/1933 | Sandford | 350/102 X |
| 3,292,569 | 12/1966 | Trigilio | 350/99 X |
| 3,734,595 | 5/1973 | Bendzick | 350/97 |

FOREIGN PATENT DOCUMENTS

| | | | |
|---|---|---|---|
| 495,840 | 9/1950 | France | 350/97 |
| 1,266,448 | 12/1963 | France | 350/97 |
| 985,881 | 3/1965 | United Kingdom | 116/63 P |
| 1,096,926 | 12/1967 | United Kingdom | 350/97 |
| 1,167,085 | 10/1969 | United Kingdom | 116/63 P |

*Primary Examiner*—John K. Corbin
*Assistant Examiner*—B. W. delos Reyes
*Attorney, Agent, or Firm*—Barnes, Kisselle, Raisch & Choate

[57] ABSTRACT

A foldable emergency reflecting device comprising three members having reflective media thereon. Each member comprises two arms extending at an acute angle with respect to an apex. The ends of the arms are pivotally interconnected such that the members can be extended to form an emergency reflective triangle or folded to form a compact triangle for storage. A foldable base is provided.

7 Claims, 8 Drawing Figures

FOLDABLE EMERGENCY REFLECTING DEVICE

Matter enclosed in heavy brackets [ ] appears in the original patent but forms no part of this reissue specification; matter printed in italics indicates the additions made by reissue.

The invention relates to reflecting devices and particularly to an emergency reflecting device.

BACKGROUND OF THE INVENTION

In connection with emergency roadway use, it has heretofore been suggested that warning devices be provided that can be positioned on the roadway substantially in advance of a disabled vehicle to warn oncoming motorists. Such devices have generally taken the form of burning flares and retro-reflective reflectors.

It has been considered impractical for most motorists to use the burning flare type of advance warning signal due to the fact that many motorists are adverse to using this type of device.

Heretofore, the most commonly used type of advance warning device was a system comprising a flat horizontal base meeting the roadway surface, and an upright housing perpendicular to the base, having located within it four reflex reflectors of approximately 3 inches in diameter, one reflector above the other, and each of these having a mating reflector opposingly disposed to provide reflectivity for motorists approaching disabled vehicles from either the front or the rear.

Recent federal legislation in the United States and Canada provides for an advance warning device comprising an equilateral triangle, having three sides of approximately two to 3 inches in width, and approximately 17 to 22 inches in length. The width of the individual legs is divided into two segments, one comprising red reflective material, and the other comprising orange fluorescent material; these jointly serving to provide for an internal triangle of orange fluorescent material, and a larger outer triangle of red reflective material. The purpose for so dividing each of the triangle's legs is to provide a reflective component for night time use, and a fluorescent component for daytime use. The red reflective component is designed to utilize either spherical beads or cubed prism retroreflective elements, and the orange fluorescent section is designed to convert ultra-violet radiant energy from the sun into a segment of the visible spectrum to delineate the device for daytime use. The standards for the red reflective section and the orange fluorescent section are in all aspects, except for photometric quality, set forth in the applicable sections of the Society of Automotive Engineers standards. The warning device must be so designed that it is capable of returning, at an observation angle of 0.2° and an entrance angle of 0°, 80 candlepower per foot-candle incident upon the device to be measured at 100 feet. At an observation angle of 1.5°, and a 0° entrance angle, the unit must yield 0.8 candlepower per incident foot-candle.

An important factor in the legislation, as it has been presented for final approval, is the fact that the device must be capable of withstanding a wind velocity of 40 miles per hour. Notwithstanding the fact that this is generously provided for by virtue of the opening in the center of the triangle, it has proven almost impossible to meet these reqirements without the use of a substantially rugged base comprising very secure means for holding the reflecting device to the base member. An object of this invention is to provide such a base and support combination in unison with a triangular warning flare.

A further object of the invention is to provision for a convenient storage in a motor vehicle, considering fully the possibility that an automobile could sustain very severe frontal or rearend damage in a collision, and at that time a flare would be required. It is impractical to consider storage of these devices in the trunk area, since jamming or distortion of the sheet metal of the body could preclude access to the device. Previous systems have generally comprised a collapsed structure far too large to conveniently store under automobile seats; especially in the case of compact and subcompact vehicles. Thus, a further object of this invention is to provide a structure whereby storage beneath the seat is completely practical.

SUMMARY OF THE INVENTION

The invention describes a foldable emergency reflecting device comprising three members having reflective and fluorescent media thereon. Each member comprises two arms extending at an acute angle with respect to an apex. The ends of the arms are pivotally interconnected such that the members can be extended to form an emergency reflective triangle. One of the connections is releasable so that the device can be folded to form a compact triangle for storage comprising only one quarter of the area of the open triangle. Conventional means for manufacturing this type of device yields a unit which will only collapse to approximately one half of its extended area. The device also comprises a foldable base.

DESCRIPTION

Figure 1:
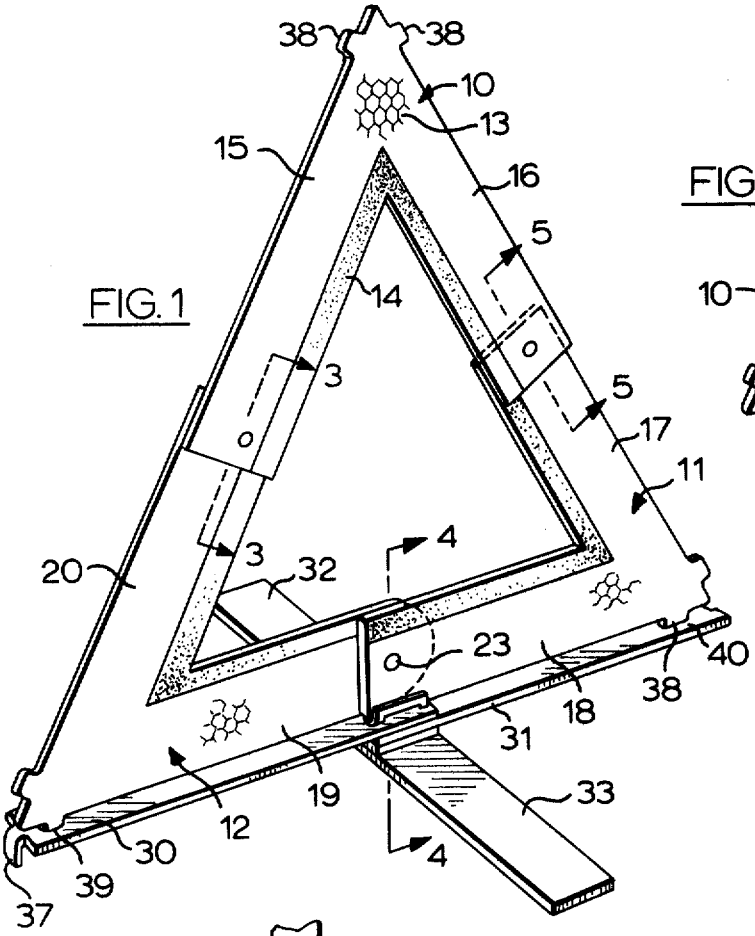
FIG. 1 is a perspective view of the device embodying the invention in expanded or unfolded condition.

Referring to FIG. 1, the foldable reflecting device embodying the invention comprises three substantially identical members 10, 11, 12 made of plastic material and preferably having cube corners reflective elements 13 on one side thereof and strips 14 of fluorescent material along the inner edges of the opposite side.

Figure 5:
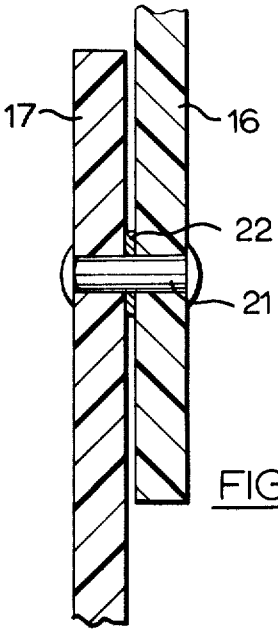
FIG. 5 is a fragmentary sectional view on an enlarged scale taken along the line 5—5 in FIG. 1.

Each of the reflective members includes arms extending at an angle with respect to an apex, being 60 degrees. Thus, the member 10 includes arms 15, 16 the member 11 includes arms 17, 18 and the member 12 includes arms 19, 20. One arm 16 of member 10 is pivoted about an axis transverse to the plane of the arms to arm 17 of member 11 by a headed pivot pin 21 (FIG. 5) with a resilient washer 22 interposed between the arm 16 and the arm 17. Similarly, the other arm 18 of member 11 is pivoted to the arm 19 of member 12 by a headed pivot pin 23. The other arm 20 of member 12 is interconnected with arm 15 of member 10 by a releasable connection formed by a pin 24 on arm 15 that extends into a metal cup 25 held on arm 20 by a pin 26. The cup 25 has a resilient spring 27 therein which resiliently surrounds and grips a tapered surface 28 on the pin 24 so that the arm 15 is releasably engaged in the arm 20 but may be readily released without the use of tools.

Figure 2:
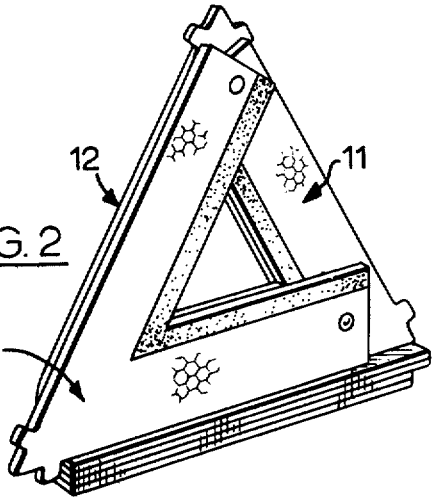
FIG. 2 is a perspective view of the same in folded condition.
Figure 3:
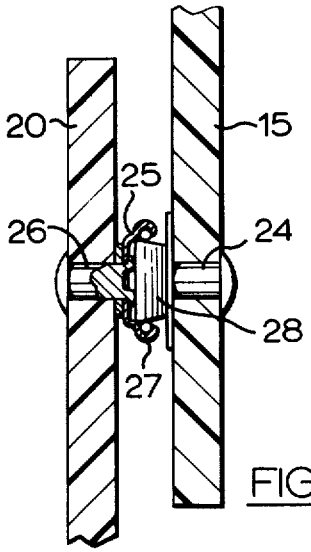
FIG. 3 is a fragmentary sectional view on an enlarged scale taken along the line 3—3 in FIG. 1.
Figure 4:
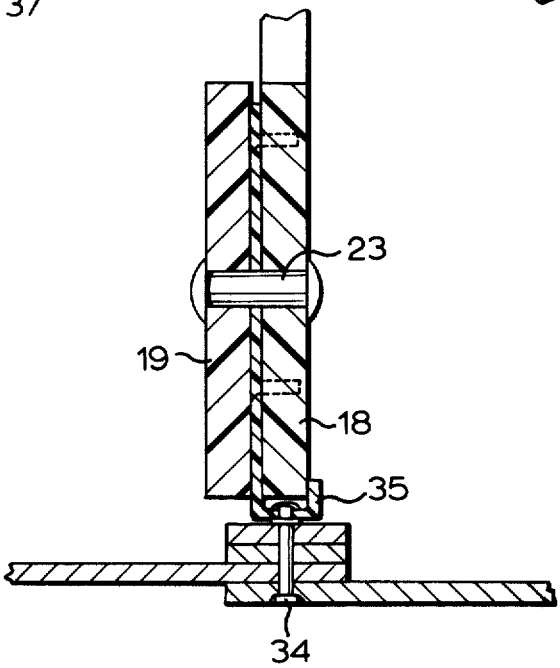
FIG. 4 is a fragmentary sectional view on an enlarged scale taken along the line 4—4 in FIG. 1.
Figure 7:
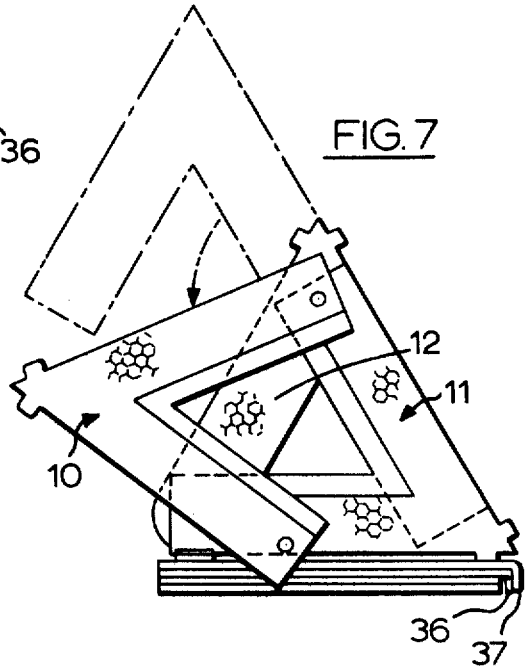
Figure 8:
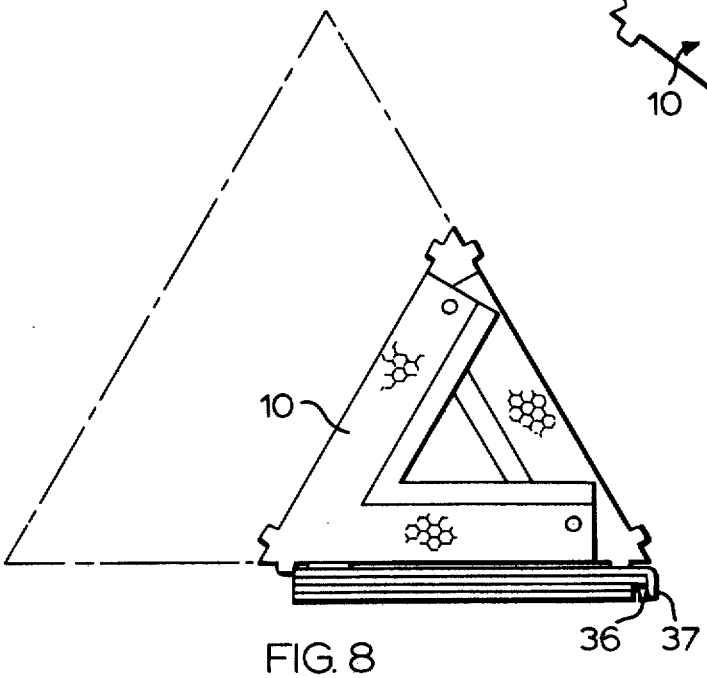

A base is provided for the reflecting device and includes flat legs 30, 31, 32, 33 which are pivoted to one another by a pin 34. Pin 34 holds a bracket 35 that is U-shaped and receives the end of the arm 18 of member 11. The legs 30–33 can be folded into overlying relationship as shown in FIGS. 2, 7 and 8. Since the legs are in different planes, legs 30, 31 have downwardly extending projections 36, 37 which engage the ground and hold the device in level position when the legs are unfolded.

Each of the members 10, 11, 12 is provided with laterally extending integral projections 38 adjacent the apex thereof. The projections 38 of the members 11, 12 extend into openings 39, 40 in the legs 31, 30, respectively when the device is in expanded position to provide rigidity to the triangle that is formed.

Figure 6:
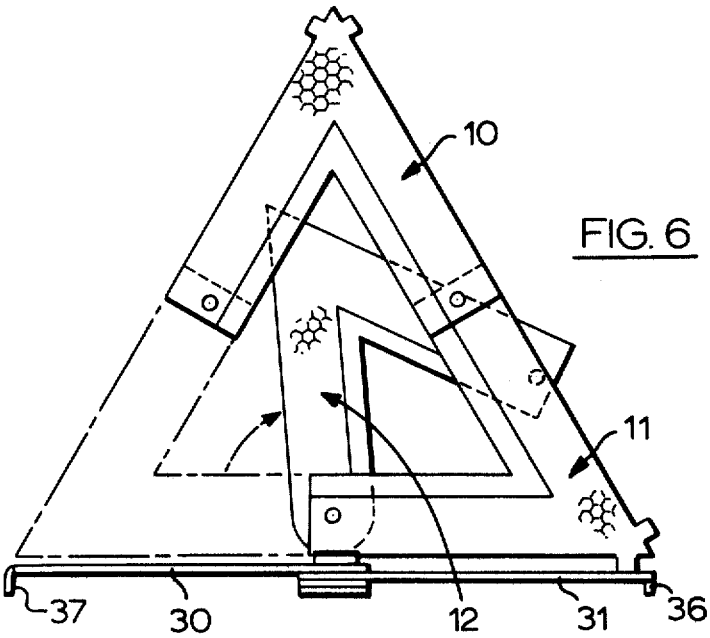
FIGS. 6–8 are views showing the manner in which the device is folded to a compact condition for storage.

Referring to FIGS. 7 and 8, in order to fold the device to compact condition, the connection between the arms 15, 20 is broken by moving the arms 15, 20 laterally or transversely with respect to one another and then the member 12 is folded, as shown in broken lines in FIG. 6, until the leg 20 overlaps the leg 17. The member 10 is then folded downwardly until the arm 16 overlaps the arm 19 and the arm 15 overlaps the arm 18.

After the member 12 has been folded upwardly, the legs can be folded into overlying relationship as shown in FIGS. 7 and 8. The resultant structure is compact and easily stored but may be readily expanded to be used for emergency purposes. It is noted that the end of arm 19 is rounded to prevent interference with the leg 30 during folding.

I claim:

[1. In a foldable emergency reflecting device, the combination comprising three members having reflective media thereon, each member comprising a pair of arms rigidly connected to one another and extending at an acute angle to one another, means interconnecting the end of the arm of one of said members with the end of the arm of a second member, means interconnecting the end of the arm of the second member to one arm of the third member, and means releasably interconnecting the other arm of the third member to the other arm of the first member to provide a generally triangular construction such that when said means releasably interconnecting is disconnected, the members may be swung relative to one another to produce a compact folded construction.]

[2. The combination set forth in claim 1 wherein each said means interconnecting said respective arms comprises a transverse pivot.]

[3. The combination set forth in claim 1 wherein said reflective media comprises retro-reflective elements.]

[4. The combination set forth in claim 1 wherein said reflective media comprises fluorescent material.]

[5. The combination set forth in claim 1 wherein said reflective media comprises retro-reflective elements and fluorescent material.]

[6. The combination set forth in claim 1 wherein the acute angle between said arms of each said member is about 60°.]

[7. The combination set forth in claim 1 wherein each said member is made of substantially flat uniformly thick material having a width greater than its thickness.]

[8. The combination set forth in claim 7 wherein said means interconnecting said arms comprises a transverse pivot.]

[9. The combination set forth in claim 8 wherein said means releasably interconnecting the arms comprises interengaging members operable by a transverse force.]

[10. The combination set forth in claim 1 wherein a base is provided, one of said arms of one of said members being fixed to said base.]

[11. The combination set forth in claim 10 wherein said base comprises a plurality of laterally extending legs.]

[12. The combination set forth in claim 11 wherein said legs are pivoted to one another for foldable movement into overlying relationship.]

[13. The combination set forth in claim 11 wherein at least two of said legs is provided to extend in underlying relation to two of said members when said members are in unfolded condition, and means interconnecting said legs and said members.]

[14. The combination set forth in claim 13 wherein said last-mentioned means comprises openings in said legs and integral projections on said members.]

[15. The combination set forth in claim 14 wherein said projections on said members are adjacent the apices of said members.]

[16. The combination set forth in claim 11 wherein said leg which overlies the other legs includes a downwardly extending projection adapted to engage the ground when said legs are in extended position.]

[17. The combination set forth in claim 11 wherein said legs comprise four legs pivotally interconnected by a single pivot, the axis of the pivot being transverse to the general plane of said members, a bracket on the uppermost of said legs, said bracket being fixed to said second-mentioned member adjacent the pivot of the other leg of the second member to the one leg of said third member.]

[18. In a foldable emergency reflecting device, the combination comprising three members having reflective media thereon, each member comprising a pair of arms rigidly connected to one another and extending at an acute angle to one another, transverse pivot means interconnecting the end of the arm of one of said members with the end of the arm of a second member, transverse pivot means interconnecting the end of the arm of the second member to one arm of the third member, means releasably interconnecting the other arm of the third member to the other arm of the first member to provide a generally triangular construction such that when said means releasably interconnecting is disconnected, the members may be swung relative to one another to produce a compact folded construction, a base, said base comprising a plurality of laterally extending legs, said legs comprise four legs pivotally interconnected by a single pivot, the axis of the pivot being transverse to the general plane of said members, a bracket on the uppermost of said legs, said bracket being fixed to said second-mentioned member adjacent the pivot of the other leg of the second member to the one leg of said third member, at least two of said legs being provided to extend in underlying relation to two of said members when said members are in the unfolded condition, and means interconnecting said legs and said members.]

[19. The combination set forth in claim 18 wherein said last-mentioned means comprises openings in said legs and integral projections on said members.]

[20. The combination set forth in claim 19 wherein said projections on said members are adjacent the apices of said members.]

[21. The combination set forth in claim 19 wherein the uppermost leg of said legs includes a downwardly extending projection adapted to engage the ground when said legs are in extended position.]

*22. In a foldable emergency reflecting device, the combination comprising*

*three members having reflective media thereon,*

*each member comprising a pair of arms rigidly connected to one another and extending at an acute angle to one another,*

*means pivotally interconnecting the end of the arm of one of said members with the end of the one arm of a second member,*

*means pivotally interconnecting the end of the other arm of the second member to one arm of the third member,*

*and means releasably interconnecting the other arm of the third member to the other arm of the first member to provide a generally triangular construction such that when said means releasably interconnecting is disconnected, the members may be swung relative to one another to produce a compact folded construction,*

*said means pivotally interconnecting the end of the arm of one of said members with the end of the arm of a second member comprising a bracket fixed on said one arm of said one of said members and transverse pin means pivoting said arm of said second member to said bracket and said one arm of said one member,*

*a base provided for the reflecting device including flat legs pivoted to one another by a pin on said bracket,*

*at least some of said legs being foldable between a position overlying one another adjacent said bracket and the arm of one of said members to a position generally at a right angle to the plane of said members.*

*23. The combination set forth in claim 22 wherein said axis of said pin means and said pivotal axis of said legs are adjacent one another and intersect.*

*24. The combination set forth in claim 23 wherein the length of each said leg is substantially the same as the length of said one arm of said first member.*

*25. The combination set forth in claim 22 wherein at least two of said legs are provided to extend in underlying relation to two of said members when said members are in the unfolded condition, and means interconnecting said last mentioned legs and said two members.*

*26. The combination set forth in claim 25 wherein said last-mentioned means comprises openings in said legs and integral projections on said members engaging said openings.*

*27. The combination set forth in claim 25 wherein said projections on said members are adjacent the apices of said members.*

*28. The combination set forth in claim 26 wherein the uppermost leg of said legs includes a downwardly extending projection adapted to engage the ground when said legs are in extended position.*

* * * * *